(12) United States Patent
Wang et al.

(10) Patent No.: US 11,853,890 B2
(45) Date of Patent: Dec. 26, 2023

(54) MEMORY DEVICE AND OPERATION METHOD THEREOF

(71) Applicant: MACRONIX INTERNATIONAL CO., LTD., Hsinchu (TW)

(72) Inventors: Chao-Hung Wang, Tainan (TW); Yu-Hsuan Lin, Taichung (TW); Ming-Liang Wei, Kaohsiung (TW); Dai-Ying Lee, Hsinchu County (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 1162 days.

(21) Appl. No.: 16/522,986

(22) Filed: Jul. 26, 2019

(65) Prior Publication Data

US 2020/0349428 A1 Nov. 5, 2020

Related U.S. Application Data

(60) Provisional application No. 62/841,832, filed on May 2, 2019.

(51) Int. Cl.
*G06N 3/082* (2023.01)
*G06N 3/063* (2023.01)
*G06N 3/048* (2023.01)

(52) U.S. Cl.
CPC ............ *G06N 3/082* (2013.01); *G06N 3/048* (2023.01); *G06N 3/063* (2013.01)

(58) Field of Classification Search
CPC .......... G06N 3/082; G06N 3/08; G06N 3/063; G06N 3/06; G06N 3/0481; G06N 3/04
See application file for complete search history.

(56) References Cited

U.S. PATENT DOCUMENTS

| | | | | |
|---|---|---|---|---|
| 2015/0286923 A1* | 10/2015 | Arthur | ..................... | G06N 3/08 706/25 |
| 2016/0217368 A1* | 7/2016 | Ioffe | ........................ | G06N 3/04 |
| 2018/0139047 A1* | 5/2018 | Woods | ....................... | G06N 3/08 |
| 2019/0385045 A1* | 12/2019 | Poovalapil | ............. | G06N 3/084 |
| 2020/0020393 A1* | 1/2020 | Al-Shamma | ......... | G06N 3/0454 |
| 2020/0218963 A1* | 7/2020 | Yasuda | .................. | G06N 3/049 |

* cited by examiner

*Primary Examiner* — Kamran Afshar
*Assistant Examiner* — Brian J Hales
(74) *Attorney, Agent, or Firm* — McClure, Qualey & Rodack, LLP

(57) ABSTRACT

Provided is an operation method for a memory device, the memory device being used for implementing an Artificial Neural Network (ANN). The operation method includes: reading from the memory device a weight matrix of a current layer of a plurality of layers of the ANN to extract a plurality of neuro values; determining whether to perform calibration; when it is determined to perform calibration, recalculating and updating a mean value and a variance value of the neuro values; and performing batch normalization based on the mean value and the variance value of the neuro values.

10 Claims, 3 Drawing Sheets

MEMORY DEVICE AND OPERATION METHOD THEREOF

This application claims the benefit of U.S. provisional application Ser. No. 62/841,832, filed May 2, 2019, the subject matter of which is incorporated herein by reference.

TECHNICAL FIELD

The disclosure relates in general to a memory device and an operation method thereof.

BACKGROUND

In non-volatile memory (NVM) based neuromorphic systems, memory cells are used to store weights.

FIG. 1 shows a conventional Artificial Neural Network (ANN). As shown in FIG. 1, the ANN 100 includes a plurality of convolution layers 110-1~110-6. In the application, the convolution layer and the layer may represent the same meaning. In training ANN, the weights may be trained or adjusted by a computer; and after training or adjustment, the computer writes the weights into the memory cells.

In ANN, a weight matrix (WM) exists between layers. The input of the layer is multiplied by the corresponding weight matrix to obtain the output of the layer for outputting to the next layer. Further, an activation function (AF) is also between the layers. After computation by the last convolution layer, the fully connected layer performs computation on the output of the last convolution layer to produce the final output.

If in needed, the weights stored in the memory cells may be adjusted by the computer. In general, if NVMs are used to implement the ANN, problems, such as weight fluctuations, program errors and retention loss, may be caused to reduce the accuracy of the ANN. Weight fluctuations refer to that the read-out weight may be fluctuated and thus is different from the actual weights stored in the memory cells. For example, the actual weight stored in the memory cell is 0.2, but the read-out weight may be fluctuated (the previously read-out weight may be 0.2 but the currently read-out weight may be 0.1). Program errors refer to that if the ideal weight simulated or trained by the computer is for example but not limited by 0.2 (that is, the ideal weight to be programmed into the memory cell is 0.2), after programming, the actual weight stored in the memory cell may become 0.3. The retention loss refers to that after long term retention, the memory state of the memory cell which stores the weight may be lost; the contents stored in the memory cell are lost and the weight is not allowed to be correctly read out.

Besides, after analysis, if the front layer (which is close to the ANN input) is implemented by the NVM, the weight fluctuations, program errors and retention loss may cause the accuracy to be greatly reduced.

Thus, there needs a memory device and an operation method thereof which may effectively improve ANN accuracy even if the ANN is implemented by NVM.

SUMMARY

According to one embodiment, provided is an operation method for a memory device, the memory device being used for implementing an Artificial Neural Network (ANN). The operation method includes: reading from the memory device a weight matrix of a current layer of a plurality of layers of the ANN to extract a plurality of neuro values; determining whether to perform calibration; when it is determined to perform calibration, recalculating and updating a mean value and a variance value of the neuro values; and performing batch normalization based on the mean value and the variance value of the neuro values.

According to another embodiment, provided is a memory device for implementing an Artificial Neural Network (ANN), the memory device including: a memory array, for storing respective weight matrix of a plurality of layers of the ANN; and a controller coupled to the memory array, the controller being configured for: reading from the memory array a weight matrix of a current layer of the ANN to extract a plurality of neuro values; determining whether to perform calibration; when the controller determines to perform calibration, recalculating and updating a mean value and a variance value of the neuro values; and performing batch normalization based on the mean value and the variance value of the neuro values.

Figure 1:
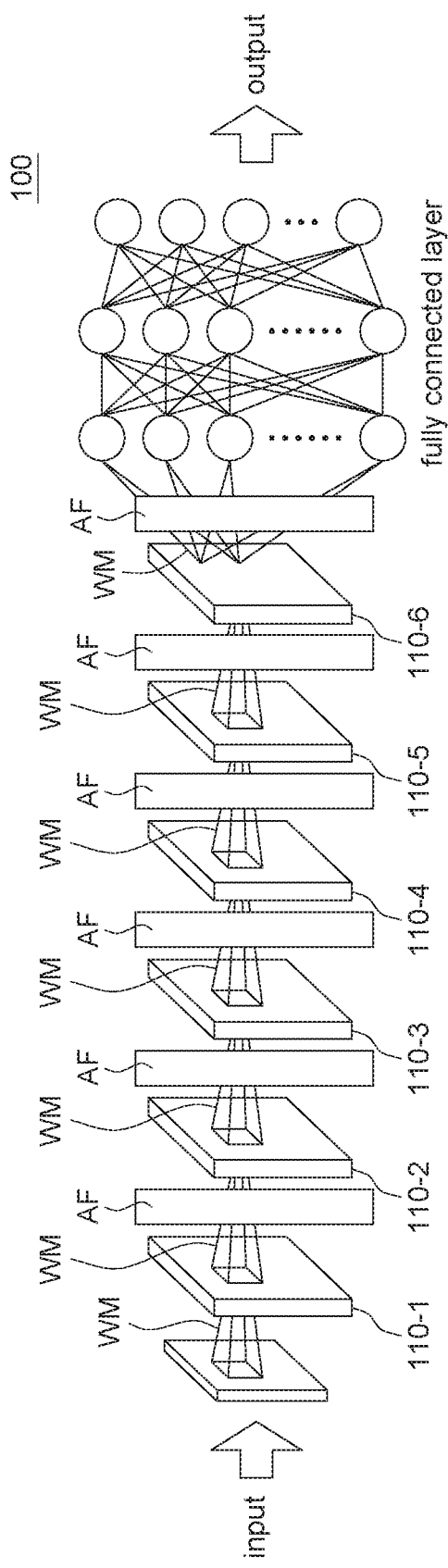
FIG. 1 (prior art) shows a conventional ANN system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

Figure 2:
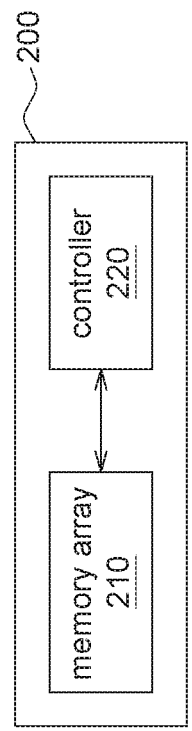
FIG. 2 shows a functional block diagram of a memory device according to one embodiment of the application.

FIG. 2 shows a functional block diagram of a memory device according to one embodiment of the application. As shown in FIG. 2, the memory device 200 includes: a memory array 210 and a controller 220. At least one weight matrix (WM) is stored in the memory array 210. The controller 220 is coupled to the memory array 210 for controlling operations of the memory array 210 to implement ANN.

Figure 3:
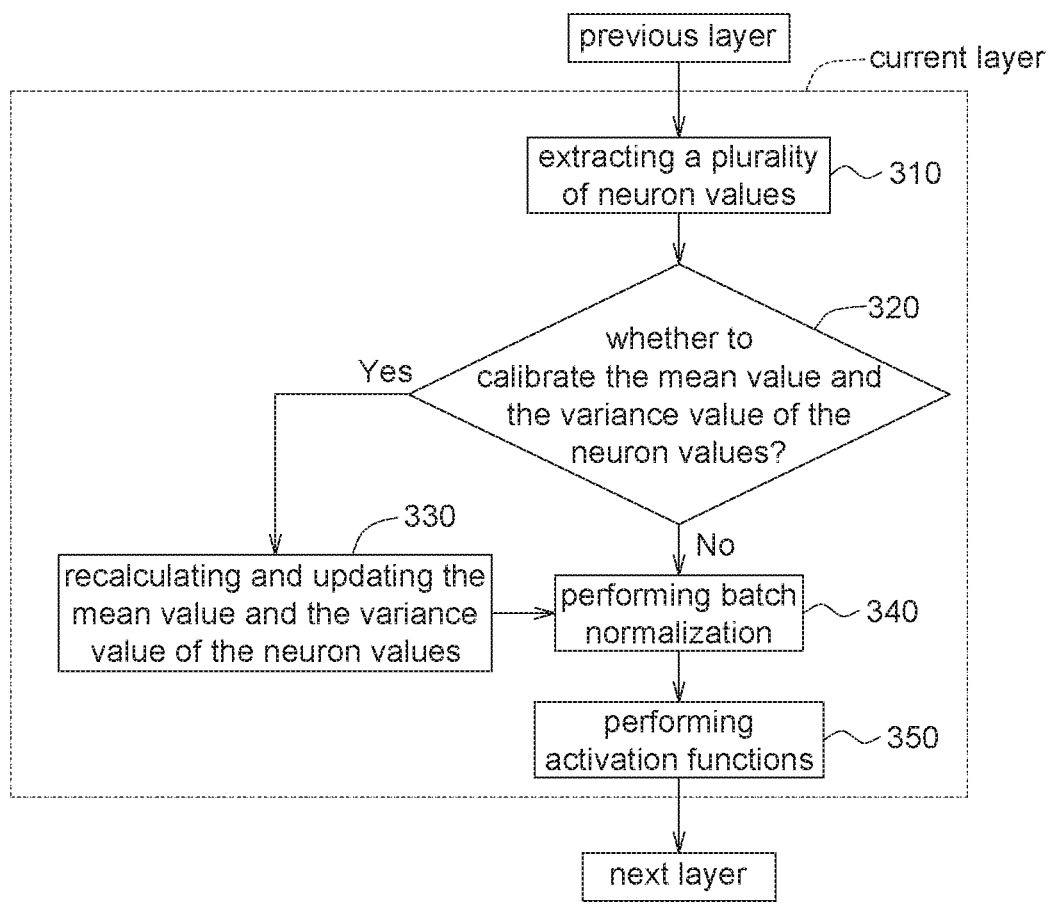
FIG. 3 shows an operation method flow chart of a memory device according to one embodiment of the application.

FIG. 3 shows an operation method flow chart of a memory device according to one embodiment of the application. As shown in FIG. 3, in step 310, a weight matrix of a current layer of a plurality of layers of the ANN is read out from the memory device to extract a plurality of neuron values. In step 320, it is determined whether the mean value and the variance value of the neuron values needs to be calibrated or not. For example but not limited by, the mean value and the variance value of the neuron values needs to be calibrated when a new weight is written into the memory array for the first time, or weight shift is induced by long term retention or the calibration is triggered by the user. For example, if the user feels that accuracy of the ANN is lowered, the user may trigger to calibrate the mean value and the variance value of the neuron values.

If yes in step 320, in step 330, the mean value and the variance value of the neuron values are recalculated and updated. After step 330, the step 340 is subsequent. If no in step 320, the step 340 is performed. In step 340, the mean value and the variance value of the neuron values are used to perform batch normalization (BN). In step 350, the activation functions (AF) are performed. In the exemplary embodiment of the application, the steps 310-350 are for example performed by the controller 220.

Figure 4:
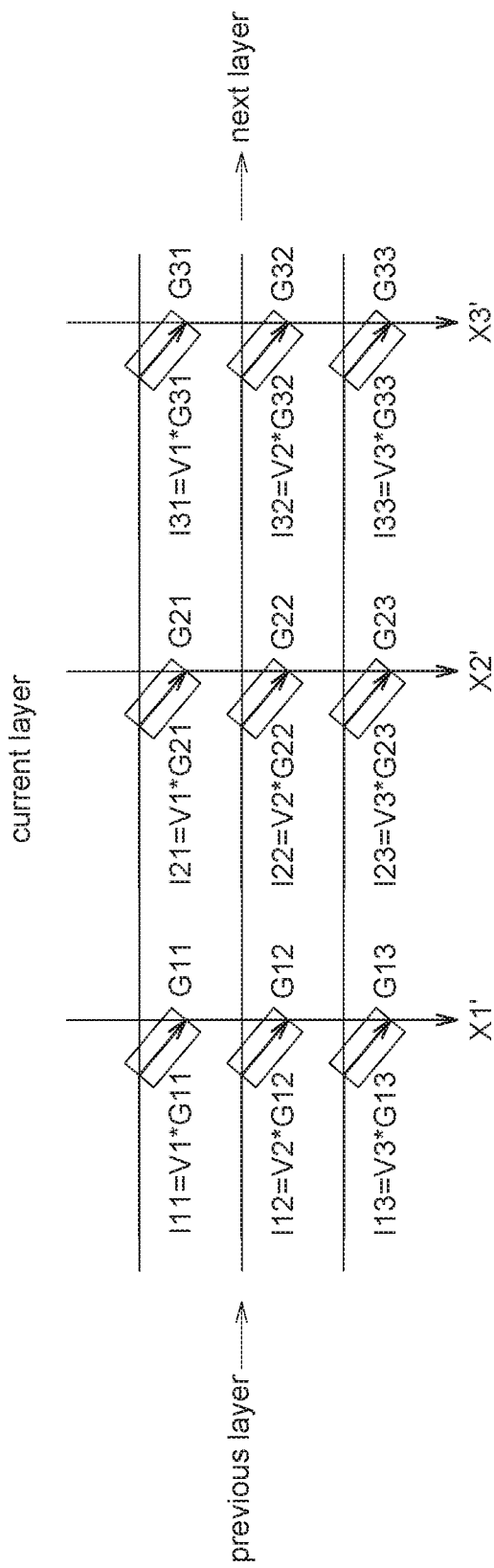
FIG. 4 shows a data flow diagram according to one embodiment of the application.

FIG. 4 shows a data flow diagram according to one embodiment of the application. In FIG. 4, the weight matrix of the current layer is for example a 3*3 weight matrix (including weights G11-G33). The application is not limited by this.

As shown in FIG. 4, the output from the previous layer is V1, V2 and V3, which is input to the current layer. The inputs V1, V2 and V3 are multiplied by the weight matrix to obtain I11=V1*G11, I12=V2*G12, I13=V3*G13, I21=V1*G21, I22=V2*G22, I23=V3*G23, I31=V1*G31, I32=V2*G32 and I33=V3*G33. I11~I33 refer to the currents which form the neuro values Xi'. The neuro values are expressed by Xi'=ΣI. For example, X1'=I11+I12+I13; X2'=I21+I22+I23 and X3'=I31+I32+I33.

In the exemplary embodiment of the application, how to obtain the mean value of the neuro values is described for example but not to limit the application. The mean value of the neuro values is obtained by the following equation (1):

$$\mu'_B = \frac{1}{m}\sum_{i=1}^{m} X'_i \quad (1)$$

In the exemplary embodiment of the application, how to obtain the variance value of the neuro values is described for example but not to limit the application. The variance value of the neuro values is obtained by the following equation (2):

$$\sigma'^2_B = \frac{1}{m}\sum_{i=1}^{m} (X'_i - \mu'_B)^2 \quad (2)$$

In the exemplary embodiment of the application, how to perform batch normalization is described for example but not to limit the application. The batch normalization is performed by the following equations (3) and (4).

$$\overline{X'_i} = \frac{X_{i'} - \mu_{B'}}{\sqrt{\sigma'^2_B + \epsilon}} \quad (3)$$

$$y'_i = BN_{\gamma,B}(X'_i) = \gamma\overline{X'_i} + \beta \quad (4)$$

In equation (3), ε refers to an error term, γ is a scale parameter (which may be user-defined) and β is a shift parameter (which may be user-defined).

In the exemplary embodiment of the application, the activation functions include but not limited by: a Rectified Linear Unit (ReLU) function, a max pooling function and a drop-out function.

In other words, in the flow chart of FIG. 3, when the step 320 determines to calibrate the mean value and the variance value of the neuro values (i.e. step 320 is yes), before BN is performed, the weights are actually read out from the memory array and are used to extract the neuro values (which may include weight errors) to recalculate and update the mean value and the variance value of the neuro values for performing BN. Further, if the step 320 determines not to calibrate the mean value and the variance value of the neuro values (i.e. step 320 is no), the previous mean value and the variance value of the neuro values are used to perform BN.

In other possible embodiments of the application, the activation functions may be performed before the step of recalculating and updating the mean value and the variance value of the neuro values, which is still within the spirit and scope of the application.

In convention, when the weights stored in the NVM memory array have errors caused by various reasons (for example weight fluctuations, program errors and retention loss), the neuro values are still obtained by the ideal weights. Thus, the accuracy of the conventional ANN is negatively affected by weight errors.

On the contrary, in the exemplary embodiments of the application, in order to improve ANN accuracy, the following technical features are introduced: (1) extracting the distribution of neuron values in each layer of the ANN; (2) calculating the mean and variance of neuron values of each layer; (3) updating the new mean and the new variance value of each layer of the ANN. That is, in the embodiment of the application, even if NVMs are used to implement the ANN, the accuracy is improved. This is because when weights stored in the NVM memory array have weight errors due to the various reasons, in the embodiment of the application, the actual weights are read out from the memory array and the mean value and the variance value of the neuro values are recalculated and updated. By so, the ANN accuracy is improved because the weight errors are eliminated by recalculation and update of the mean value and the variance value of the neuro values.

Further, in the embodiment of the application, the reason to extract the neuro values from the ANN is as follows: (1) Program errors, weight fluctuations, and retention loss will reduce memory reliability and the neuro values after sum-of-product operation may have errors. The errors will pass through the whole ANN, leading to strong inference accuracy loss. (2) Weight errors induced by program errors and weight fluctuations may be monitored through the distribution of neuron values. Moreover, long term retention loss also can induce weight shift and neuron value incorrectness. By updating the new parameters (i.e. the new mean value and the new variance value) of the neuro values based on the distribution of the neuron values, the accuracy loss can be repaired.

Further, in the embodiment of the application, after the mean value and the variance value of the neuro values are recalculated, the updated mean value and the updated variance value of the neuro values are written back to the memory array to complete the repair process. By so, the re-programming procedure is not needed and the complexity is also lowered.

In the embodiment of the application, ANN may be implemented by any kind of memories, for example but not limited by, Static Random Access Memory (SRAM), Dynamic Random Access Memory (DRAM), NVM, Embedded DRAM (eDRAM), Embedded NVM (eNVM), Magnetoresistive Random Access Memory (MRAM), Phase Change Memory (PCM), Resistive random-access memory (RRAM or ReRAM) or Ferroelectric RAM (FeRAM or FRAM) etc.

The accuracy implementation of the embodiment of the application is applied by any type of ANNs. Further, the accuracy improvement of the embodiment of the application may be used to deal with any kind of errors occurred in the memory array, for instance but not limited by: program error, read fluctuation, read disturb, retention . . . , etc. The embodiment of the application may be applied in any system that suffers errors and needs to repair the imperfections.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operation method for a memory device, the memory device being used for implementing an Artificial Neural Network (ANN), the operation method including:
    reading from a plurality of memory cells of the memory device a weight matrix of a current layer of a plurality of layers of the ANN to extract a plurality of neuro values by the memory device;
    determining whether to perform calibration by the memory device, wherein the plurality of neuro values are formed by currents generated by the plurality of memory cells of the memory device;
    when it is determined to perform calibration, recalculating and updating a mean value and a variance value of the plurality of neuro values by the memory device; and
    performing batch normalization based on the mean value and the variance value of the plurality of neuro values by the memory device,
    the step of determining whether to perform calibration includes: determining to perform calibration when weight shift is induced;
    when calibration of the mean value and the variance value of the plurality of the neuro values is determined, before batch normalization is performed, a plurality of weights are read out from the plurality of memory cells of the memory array and are used to extract the plurality of neuro values to recalculate and update the mean value and the variance value of the plurality of neuro values for performing batch normalization.

2. The operation method according to claim 1, wherein an activation function is performed after batch normalization is performed.

3. The operation method according to claim 1, wherein an activation function is performed before the mean value and the variance value of the plurality of neuro values are recalculated and updated.

4. The operation method according to claim 1, wherein the step of determining whether to perform calibration includes: it is determined to perform calibration when a weight is written into the memory device first time.

5. The operation method according to claim 1, wherein the step of determining whether to perform calibration includes: it is determined to perform calibration when triggered by a user.

6. A memory device for implementing an Artificial Neural Network (ANN), the memory device including:
    a memory array, for storing respective weight matrix of a plurality of layers of the ANN; and
    a hardware controller coupled to the memory array,
    the hardware controller being configured for:
        reading from a plurality of memory cells of the memory array a weight matrix of a current layer of the ANN to extract a plurality of neuro values by the memory device;
        determining whether to perform calibration by the memory device, wherein the plurality of neuro values are formed by currents generated by the plurality of memory cells of the memory device;
        when the hardware controller determines to perform calibration, recalculating and updating a mean value and a variance value of the plurality of neuro values by the memory device; and
        performing batch normalization based on the mean value and the variance value of the plurality of neuro values by the memory device,
    wherein the hardware controller determines to perform calibration when weight shift is induced;
    when calibration of the mean value and the variance value of the plurality of the neuro values is determined, before batch normalization is performed, a plurality of weights are read out from the plurality of memory cells of the memory array and are used to extract the plurality of neuro values to recalculate and update the mean value and the variance value of the plurality of neuro values for performing batch normalization.

7. The memory device according to claim 6, wherein the hardware controller is configured for: performing an activation function after batch normalization is performed.

8. The memory device according to claim 6, wherein the hardware controller is configured for: performing an activation function before the mean value and the variance value of the plurality of neuro values are recalculated and updated.

9. The memory device according to claim 6, wherein the hardware controller is configured for: determining to perform calibration when a weight is written into the memory device first time.

10. The memory device according to claim 6, wherein the hardware controller is configured for: determining to perform calibration when triggered by a user.

* * * * *